United States Patent [19]

Bayer et al.

[11] Patent Number: 5,254,613

[45] Date of Patent: Oct. 19, 1993

[54] MOLDING COMPOSITION FOR THE PRODUCTION OF INORGANIC SINTERED PRODUCTS

[75] Inventors: Michael Bayer, Lützelburg; Iris Nagl, Burgheim, both of Fed. Rep. of Germany

[73] Assignee: Hoechst Aktiengesellschaft, Frankfurt am Main, Fed. Rep. of Germany

[21] Appl. No.: 899,483

[22] Filed: Jun. 16, 1992

[30] Foreign Application Priority Data

Jun. 18, 1991 [DE] Fed. Rep. of Germany ....... 4119997

[51] Int. Cl.$^5$ .................................................. C08J 5/00
[52] U.S. Cl. .................................... 524/277; 524/406; 524/413; 524/428; 524/443
[58] Field of Search ............... 524/277, 406, 413, 428, 524/443

[56] References Cited

U.S. PATENT DOCUMENTS 4,906,424 3/1990 Hughes et al. .................... 264/63
5,019,537 5/1991 Kato et al. .

FOREIGN PATENT DOCUMENTS 3611271 7/1988 Fed. Rep. of Germany .
3630690 5/1989 Fed. Rep. of Germany .
3743217 6/1989 Fed. Rep. of Germany .

*Primary Examiner*—Melvyn I. Marquis
*Assistant Examiner*—D. Aylward

[57] ABSTRACT

In a ceramic or powder-metallurgical molding composition which contains waxes as binders, the addition of an ethylene/vinyl acetate copolymer, optionally in combination with an organic peroxide and an azo ester and crosslinking of the binder, leads to an improvement in the dimensional stability and the dewaxing of injection-molded moldings.

6 Claims, No Drawings

MOLDING COMPOSITION FOR THE PRODUCTION OF INORGANIC SINTERED PRODUCTS

DESCRIPTION

The invention relates to a ceramic or powder-metallurgical molding composition which is shaped by injection molding and which has been prepared using a chemically reacting plasticizer.

The starting material for injection-molded ceramic or powder-metal products is usually a fine-grained powder which is coated with an organic plasticizer and then shaped by injection molding. Before sintering the powder, the organic plasticizer is removed in a process which is known as debinding or dewaxing.

Injection molding compositions which are based on powder-metallurgical or ceramic powders and which meet the rheological requirements of injection molding technology can be prepared with the aid of polyolefinic plastics, such as polypropylenes or polyethylenes, in combination with paraffins.

Both the injection molding process and the mold release can be carried out without any problems using these compositions.

The use of polyethylene waxes in combination with ester waxes based on crude montan wax or EVA polymers allows processing and shaping of the compositions with low metal abrasion, specially in the case of ceramic powders. Thus, the injection molding composition prepared therewith can be processed on all conventional injection molding machines which have hardened wear surfaces. The use of polyethylene waxes in combination with ester waxes based on crude montan wax in powder injection molding compositions allows molding temperatures below 150° C. The molding compositions prepared in this way can be processed by low-pressure injection molding.

However, it has been found that at temperatures above 200° C. the dimensional stability of the components which have been produced from the injection molding compositions described is not sufficient to ensure distortion-free dewaxing of, i.e. removal of the plasticizer from, the components. On the contrary, the green moldings tend to flow under the influence of heat, which impairs the dimensional stability of the components.

It has also been found that, because of the unfavorable decomposition characteristics of the thermoplastics described above, the dewaxing of the moldings requires a process time of several days in order to obtain crack-free components. Consequently, the powder injection technique becomes an uneconomic process, especially in powder metallurgy.

The decomposition of the organic auxiliaries is thus determined by the parameters temperature and time.

It is known to control the dewaxing step over a wide temperature range as a function of the composition of the off-gas (cf. DE 3611271). In this case the combustion or evaporation of the plasticizer is spread over a wide temperature range by widening the molecular weight distribution by selection of high molecular weight and low molecular weight components. A similar procedure is described in DE 3,630,690, the plasticizer components proposed being oils, paraffins, waxes, polypropylene, polyethylene and ethylene/vinyl acetate copolymers. In this case also the composition of the plasticizer was chosen with the aim of a broad molecular mass distribution.

According to the processes described, it is possible to produce moldings by injection molding, the combustion or evaporation of the individual components in each section of the molding taking place in the same way as a function of the temperature. This leads to the formation of vapor phases at the surface, but also within the body, the molding becoming swollen.

It has been found that the dewaxing of the injection-molded molding must always take place from outside to inside in order to ensure that the gaseous decomposition products formed are removed through the resulting channel pores into the environment. The prerequisite for this is an organic substance which is readily vaporizable or can readily be reacted with the gas atmosphere, preferably oxygen-enriched air.

It has also been found that the molding must be mechanically strengthened, for example by crosslinking the organic auxiliary, during the dewaxing step in order to ensure dimensional stability.

Finally, it has been found that the dewaxing of the moldings is accelerated by free-radical degradation of the organic binder above the molding temperature.

The invention thus relates to a molding composition which is based on inorganic sintering materials and consists of 70 to 96 parts by weight of a ceramic or metal powder
1 to 10 parts by weight of a semi-synthetic wax based on crude montan wax,
2 to 10 parts by weight of a polyolefin wax,
0.98 to 9.9 parts by weight of an ethylene/vinyl acetate copolymer,
0 to 0.05 part by weight of an azo ester and
0 to 0.05 part by weight of an organic peroxide.

The molding composition according to the invention contains nonmetallic-inorganic and metallic powders as the base.

These include powders based on $Al_2O_3$, AlN, $Al_2TiO_5$, $B_4C$, WC, SiC and silicates and powders which contain clay, kaolin, feldspar or quartz.

The metal-based powders according to the invention are not oxidizable up to temperatures of 400° C. These include stainless steel powders, tool steel powders or noble metallic powders. The maximum particle size of the nonmetallic-inorganic and metallic powders according to the invention is 150 μm.

The molding composition also contains waxes. These waxes are natural waxes, fully synthetic or semi-synthetic waxes, polyolefin waxes or amide waxes.

Preferred waxes are semi-synthetic waxes based on crude montan wax and polyolefin waxes.

The preferred semi-synthetic wax based on crude montan wax has the following characteristics:

| | |
|---|---|
| Dropping point | 79 to 90° C. |
| Acid number | 5 to 35 mg KOH/g |
| Saponification number | 70 to 160 mg KOH/g |
| Density | 0.97 to 1.03 g/cm$^3$ |
| Viscosity | 20 to 80 mPa · s at 100° C. |

The preferred wax based on polyolefin wax has the following characteristics:

| | |
|---|---|
| Dropping point | 102 to 158° C. |
| Acid number | 0 to 64 mg KOH/g |
| Saponification number | 0 to 115 mg KOH/m |

| | |
|---|---|
| Density | 0.87 to 1.03 g/cm³ |
| Viscosity | 100 to 1500 mPa · s at 170° C. |

The preferred semi-synthetic wax based on crude montan wax is formed by oxidative bleaching of crude montan wax and esterification of the resulting acid wax with a $C_2$ to $C_8$ diol. Waxes of this type have been available commercially for many years.

The preferred wax based on polyolefin wax is formed by mass polymerization in the Ziegler low-pressure process. These polyolefin waxes can be converted to oxidized waxes by treating the melt with air.

These waxes also have been commercially available for many years.

The molding composition according to the invention also contains an ethylene/vinyl acetate copolymer. It has a melt index, according to ASTM D 1238, of 0.2–440 dg/min, preferably 0.2–168 dg/min, a vinyl acetate content of 11–42%, preferably 11–28%, and a Vicat softening temperature, according to ASTM D 790, of 36°–80° C., preferably 74°–79° C.

Ethylene/vinyl acetate copolymers are available commercially and are used to increase toughness, flexibility and elasticity in plastics, waxes and hot-melt adhesives.

The molding composition according to the invention also contains, insofar as it is chemically crosslinked, an organic peroxide which has a scorch temperature of at least 100° C., preferably a scorch temperature of 160° C. Suitable peroxides are 1,1-di(t-butylperoxy)trimethylcyclohexane, n-butyl 4,4-di(t-butylperoxy)valerate, dicumyl peroxide, t-butylcumyl peroxide, 1,3-di(t-butylperoxyisopropyl)benzene, 3,3,6,6,9,9-hexamethyl-1,2,4,5-tetraoxacyclononane and 2,5-dimethyl-2,5-di(t-butylperoxy)hexane, preferably 2,5-dimethyl-2,5-di(t-butylperoxy)hexane. Organic peroxides are available commercially and are used, inter alia, for crosslinking thermoplastics and elastomers or for the thermal degradation of polybutylene or polyvinyl chloride.

In the case of chemical crosslinking, the molding composition according to the invention also contains a free radical-forming agent in the form of an azo ester, for example 2,2'-azo-bis(2-acetoxybutane), 2,2'-azo-bis(2-acetoxypropane), 2,2'-azo-bis(2-acetoxy-3-methylbutane), 3,3'-azo-bis(2-acetoxy-2,4-dimethylpentane), 2,2'-azo-bis(2-acetoxy-4-methylpentane), 1,1'-azo-bis(1-acetoxycyclohexane), 1,1'-azo-bis(1-acetoxy-1-phenylethane), 2,2'-azo-bis(2-formyloxybutane), 1,1'-azo-bis(1-propionoxycyclohexane),2,2'-azo-bis(2-benzoyloxypropane), 2,2'-azo-bis(1-propionoxycyclohexane),2,2'-azo-bis(2-benzoyloxypropane), 2,2'-azo-bis(2-pivaloyloxypropane), 2-(2'-acetoxyprop-2'-yl-azo)-2-acetoxybutane, 1-formyloxy-1'-acetoxy-2,2'-azo-bis-cyclohexane or (2-acetoxy-4-methylpent-2-yl)-(1'-acetoxycyclohex-1'-yl)-diazene. 2,2'-Azo-bis(2-acetoxypropane) is preferably used.

If the molding composition is crosslinked by irradiation, peroxide and azo ester are not absolutely essential constituents, but can accelerate the crosslinking of the binder.

The molding composition has the following composition:

| | |
|---|---|
| Ceramic or metal powder | 70 to 96, preferably 85 to 94 parts by weight, |
| Semi-synthetic wax | 1 to 10, preferably 1.5 to 6 parts by weight, |
| Polyolefin wax | 2 to 10, preferably 3 to 6 parts by weight, |
| EVA copolymer | 0.98 to 9.9, preferably 1.5 to 3 parts by weight, |
| Organic peroxide | 0 to 0.05, preferably 0.02 to 0.04 part by weight, and |
| Azo ester | 0 to 0.05, preferably 0.02 to 0.04 part by weight. |

The molding composition according to the invention is prepared and processed in the following way:

1. Organic binder

In order to prepare the binder component according to the invention, the semi-synthetic wax based on crude montan wax and the polyolefin wax are melted at a temperature of 130° to 160° C. in a suitable stirred vessel and processed to a homogeneous melt. The ethylene/vinyl acetate copolymer is now added to the melt, with stirring. The mixture is stirred at 130° to 160° C. until all of the components have completely dissolved in the melt. The organic peroxide and the azo ester are then added carefully, with stirring.

2. Preparation of the injection molding composition

The organic binder from 1. is melted in a heatable kneader. The metal or ceramic powder is kneaded into the melt present in the kneader at a temperature of 130° to 170° C.

The thermoplastic kneaded composition is comminuted to give free-flowing granules, preferably by extrusion, and processed on an injection molding machine to give a molding.

In the cooled state, the molding ejected from the mold is distinguished by good strength, which ensures nondestructive deburring and mechanical workability.

3. Improvement in the dimensional stability 3.1 By means of chemical crosslinking The molding is first heated in an oven at a maximum heating rate of 20 K/min to 170° to 200° C., preferably 180° to 190° C., and kept at this temperature for 0.1–2 h.

During this treatment the viscosity of the organic binder is increased to such an extent by free radical crosslinking of the EVA component as a result of the cleavage of the organic peroxide that deformation of the green molding as a consequence of a reduction in viscosity caused by a further increase in temperature is excluded.

As a result of this measure, the shape of the molding is retained throughout the entire period of the subsequent dewaxing and sintering process.

3.2 By means of irradiation

The molding is irradiated at room temperature for a maximum of 1 h with $\beta$-radiation or $\gamma$-radiation having a wavelength of less than 300 nm. By this means the organic binder undergoes free-radical crosslinking, as a result of which the green molding is no longer able to deform when the temperature is further increased.

4. Dewaxing

The dewaxing of the binder components of the molding composition according to the invention is carried out in the temperature range of 200° to 400° C. in an oxygen-enriched atmosphere.

At a temperature above 220° C. the wax components, especially those which contain polypropylene, undergo free-radical degradation as a consequence of cleavage of the organic peroxide.

Under the exclusion of oxygen, which occurs inside the molding despite the oxygen-containing gas atmosphere outside the molding, the constituents of the binder, which contains polyethylene (that is to say also the EVA copolymer), undergo free radical degradation, following cleavage of the azo ester, in a temperature range between 300° and 350° C.

The degradation products are readily oxidizable by the oxygen-enriched oven atmosphere, from the outer region of the molding into the interior of the molding. The dewaxing takes place at an oven chamber pressure of max. 1.1 bar (abs).

The oxygen-enriched gas is thus pressed into the pores formed in the molding by oxidation. When dewaxing is complete, the oven atmosphere is switched to blanketing gas, depending on the powder raw material.

The dewaxed molding can be brought to the sintering temperature only after this step has been carried out. According to this process, an injection-molding having a wall thickness of 6 to 8 mm is dewaxed and sintered, free from distortion, within 24 h.

The following examples are intended to illustrate the invention.

EXAMPLE 1

1.2 parts by weight of ester wax based on crude montan wax (dropping point: 79°-85° C., acid number: 15-20, saponification number: 130-160, density: 1.01-1.03 g/cm$^3$, viscosity: about 30 mPa.s/100° C.) were melted with 2.4 parts by weight of polyolefin wax (dropping point: 158° C., acid number: 0, saponification number: 0, density: 0.87-0.89 g/cm$^3$, viscosity: 1500 mPa.s/170° C.) and 2.4 parts by weight of an ethylene/vinyl acetate copolymer (Melt Index: 0.2-0.4 dg/min, VA content: 11-13%, Vicat softening point: 79° C.) at 150° C. in a stirred vessel and processed to give a homogeneous melt.

0.03 part by weight of 2,2-azo-bis(2-acetoxypropane) and 0.03 part by weight of an organic peroxide (scorch temperature: about 160° C.) were stirred into this melt. 94 parts by weight of a stainless steel powder having a particle size of less than 100 μm were then kneaded into the polymer melt at 150° C. The thermoplastic molding composition was then processed by injection molding to give test rods having a diameter of 8 mm and a length of 50-60 mm. Prior to dewaxing, the test pieces were rendered dimensionally stable by irradiation with γ-radiation for 1 h.

The test pieces were then dewaxed stepwise at 230° C., 280° C., 330° C. and 380° C. in an oven in an oxygen-enriched atmosphere (concentration: 50% by volume of air, 50% by volume of oxygen, oven chamber pressure: 1.1 bar abs).

The holding times at the indicated temperatures were 4 h in each case. The heating rates between the temperature plateaux were 2 K/min. When dewaxing was complete, the oven atmosphere was adjusted to an inert atmosphere using nitrogen in place of the abovementioned air/oxygen mixture. Sintering followed at 1200° C.

The resulting components were crack- and distortion-free.

EXAMPLE 2

3 parts by weight of ester wax based on crude montan wax (dropping point: 79°-85° C., acid mumber: 15-20, saponification number: 130-160, density: 1.01-1.03 g/cm$^3$, viscosity: about 30 mPa.s/100° C.) were melted with 7 parts by weight of polyolefin wax (dropping point: 113°-118° C., acid number: 16-19, saponification number: 30-45, density: 0.97-0.99 g/cm$^3$, viscosity: 200 mPa.s/140° C.) and 6 parts by weight of an ethylene/vinyl acetate copolymer (melt index: 0.2-0.4 dg/min, VA content: 11-13%, Vicat softening point: 79° C.) at 150° C. in a stirred vessel and processed to give a homogeneous melt 0.07 part by weight of an azo ester 2,2-azo-bis(2-acetoxypropane) and of an organic peroxide (scorch temperature: about 160° C.) were added to this melt, with stirring.

85 parts by weight of aluminum oxide having an average particle diameter of 5 μm were then kneaded into the melt. The temperature was 150° C. The kneaded composition obtained from this melt was not very abrasive, as shown by the whiteness of the composition.

The composition was injection-moulded at 150° C. to give rods having a diameter of 6 mm and a length of 50 mm.

The cold molded rods were distinguished by a high strength.

The rods were then placed on a two-point support in an oven. The two support points were about 40 mm apart, so that the moldings had no support in the central section. The test pieces arranged in this way were heated to 180° C. and kept at this temperature for about 1 h.

The sag of the rods at the lowest point was <1 mm.

The rods were then dewaxed stepwise at 230° C., 280° C., 330° C. and 380° C. in the same oven in an oxygen-enriched gas atmosphere (concentration: 50% by volume of air, 50% by volume of oxygen, oven chamber pressure: 1.1 bar abs). The holding times at the indicated temperatures were 4 h in each case. The heating rates between the temperature plateaux were 2 K/min.

When the dewaxing step was complete, the samples were heated at a heating rate of 5 K/min to about 1400° C. and sintered.

The resulting components were crack-free.

We claim:

1. A molding composition which is based on inorganic sintering materials and comprises
   70 to 96 parts by weight of a ceramic or metal powder,
   1 to 10 parts by weight of a semi-synthetic wax having a dropping point of 79° to 90° C., an acid number of 5 to 35 mg of KOH/g, a saponification number of 70 to 160 mg of KOH/g, a density of 0.97 to 1.03 g/cm$^3$ and a viscosity at 100° C. of 20 to 80 mPa.s,
   2 to 10 parts by weight of a polyolefin wax having a dropping point of 102° to 158° C., an acid number of 0 to 64 mg of KOH/g, a saponification number of 0 to 115 mg of KOH/g, a density of 0.87 to 1.03 g/cm$^3$ and a viscosity at 170° C. of 100 to 1500 mPa.s,
   0.98 to 9.9 parts by weight of an ethylene/vinyl acetate copolymer having a melt index of 0.2 to 440 dg/min, a vinyl acetate content of 11 to 42% and a Vicat softening point of 36° to 80° C., 0 to 0.05 part by weight of an organic peroxide having a scorch temperature of greater than 100° C. and 0 to 0.05 part by weight of an azo ester.

2. A molding composition as claimed in claim 1, wherein said composition consists essentially of:
   85 to 94 parts by weight of the ceramic or metal powder,
   1.5 to 6 parts by weight of the semi-synthetic wax,
   3 to 6 parts by weight of the polyolefin wax,
   1.5 to 3 parts by weight of the ethylene/vinyl acetate copolymer,
   0.02 to 0.04 part by weight of the organic peroxide, and
   0.02 to 0.04 part by weight of the azo ester.

3. A molding composition as claimed in claim 1, wherein the ceramic or metal powder comprises $Al_2O_3$, AlN, $Al_2TiO_5$, $B_4C$, WC, SiC, a silicate, feldspar, quartz, or a metal which is not oxidizable up to temperatures of 400° C.

4. A molding composition as claimed in claim 1, wherein the semi-synthetic wax is derived from crude montan wax by oxidative bleaching followed by esterification of the resulting acid wax with a $C_2$ to $C_8$ diol.

5. A molding composition as claimed in claim 1, wherein the vinyl acetate content of the ethylene/vinyl acetate copolymer is 11 to 28%, and the Vicat softening temperature of this copolymer is 74° to 79° C.

6. A kneaded, comminuted molding composition comprising the composition as claimed in claim 2, kneaded together and comminuted to provide essentially free-flowing granules.

* * * * *